(12) United States Patent
Hughson et al.

(10) Patent No.: US 6,796,307 B1
(45) Date of Patent: Sep. 28, 2004

(54) MULTIPLE PERSON HIGH ALTITUDE RECYCLING BREATHING APPARATUS

(75) Inventors: Wes Hughson, Panama City Beach, FL (US); Kirk Vanzandt, Panama City, FL (US); Ken Powell, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 222 days.

(21) Appl. No.: 10/132,676

(22) Filed: Apr. 22, 2002

(51) Int. Cl.[7] ............................. A62B 23/02; A62B 7/10
(52) U.S. Cl. ............................. 128/205.12; 128/205.17; 128/204.28; 128/205.27; 128/205.28; 128/205.13
(58) Field of Search ................. 128/205.12, 205.13, 128/205.14, 205.17, 204.28, 201.25, 910, 914, 205.27, 205.28, 205.22

(56) References Cited

U.S. PATENT DOCUMENTS

| | | | | |
|---|---|---|---|---|
| 2,586,670 A | * | 2/1952 | Lambertsen | 96/149 |
| 2,614,561 A | * | 10/1952 | Fox | 128/205.12 |
| 2,837,413 A | * | 6/1958 | Hay | 422/49 |
| 2,877,098 A | * | 3/1959 | Ruth | 422/177 |
| 3,162,048 A | * | 12/1964 | Albertson et al. | 73/756 |
| 3,378,005 A | * | 4/1968 | Smith, Jr. | 128/205.13 |
| 3,589,870 A | * | 6/1971 | Rankin | 422/122 |
| 3,615,233 A | * | 10/1971 | Doering et al. | 422/117 |
| 3,738,360 A | * | 6/1973 | Dryden | 128/205.28 |
| 3,830,632 A | * | 8/1974 | Guzay | 422/120 |
| 3,929,127 A | * | 12/1975 | Barrington | 128/205.12 |
| 4,086,923 A | * | 5/1978 | Henkin | 128/205.11 |
| 4,108,172 A | * | 8/1978 | Moore, Jr. | 128/205.12 |
| 4,193,966 A | * | 3/1980 | Dowgul | 422/122 |
| 4,764,346 A | * | 8/1988 | Lewis et al. | 422/120 |
| 4,781,184 A | * | 11/1988 | Fife | 128/205.12 |
| 5,042,471 A | * | 8/1991 | Drews et al. | 128/202.26 |

* cited by examiner

*Primary Examiner*—Henry Bennett
*Assistant Examiner*—Mital Patel
(74) *Attorney, Agent, or Firm*—James T. Shepherd; Donald G. Peck

(57) ABSTRACT

A life support system has a semi-closed rebreather supplying oxygen for multiple users, such as high altitude parachutists. A first tank supplies oxygen to initially purge the system, and a second, larger tank supplies oxygen at prescribed amounts for the duration of a mission. Users are connected by hoses to an inlet hose manifold on a scrubber body of the rebreather. The inlet hose manifold has an inlet port boss to receive exhaled gas from each user and an overpressure valve vents excessive amounts of exhaled gas. A $CO_2$ absorbent in the scrubber body scrubs $CO_2$ from the exhaled gas. An outlet hose manifold is connected to the scrubber body and has an inlet fitting to supply oxygen and at least one outlet port boss to feed the oxygen and the $CO_2$ scrubbed gas to the users. This reliable system is lighter-weight and smaller than contemporary systems.

16 Claims, 2 Drawing Sheets

MULTIPLE PERSON HIGH ALTITUDE RECYCLING BREATHING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a life support system using less oxygen for high altitude parachutists. More particularly, this invention has a semi-closed breathing system that adds measured amounts of oxygen to recycled gas for multiple users.

Aircraft crews and parachutists need breathing systems that furnish oxygen for life support at high altitude. Some contemporary systems, such as open-circuit breathing systems are heavy and bulky and tend to be unduly complicated to compromise mission effectiveness.

One current system requires a ground oxygen supply, an aircraft oxygen supply, and a man carried oxygen supply that are all open circuit systems that require large quantities of oxygen to operate. This current system uses large "K" oxygen bottles weighing 125 pounds each that are used for both the ground and aircraft systems. Six men would require around 4 to 5 "K" bottles to complete the ground and aircraft phases of a 4-hour parachuting operation (3 hours on bottles on ground and/or aircraft and 1 hour under parachute canopy with a man carried system). Clearly, considerable space and payload is sacrificed because of the amount and weight of the required oxygen bottles, and the separate ground and aircraft systems greatly increase the logistics burden.

Thus, in accordance with this inventive concept, a need has been recognized in the state of the art for a high-altitude, semi-closed life-support system supplying oxygen and recirculating gas to multiple users.

SUMMARY OF THE INVENTION

The present invention provides a life support system having a semi-closed rebreather supplying oxygen for multiple users. The rebreather has a scrubber body having an inlet hose manifold connected to its first side. The inlet hose manifold has at least one inlet port boss to receive exhaled gas, and an overpressure valve fitting communicates with the inlet hose manifold to vent overpressure amounts of the exhaled gas. A $CO_2$ absorbent in the scrubber body receives the exhaled gas and scrubs $CO_2$ from the exhaled gas. An outlet hose manifold connected to a second side of the scrubber body has an inlet fitting to supply oxygen and at least one outlet port boss to feed the oxygen and the $CO_2$ scrubbed gas to the users. A first tank supplies oxygen to initially help purge the system, and a second, larger tank supplies oxygen at prescribed amounts for the duration of a mission.

An object of the invention is to provide a life-support breathing system of reduced complexity for multiple high altitude parachutists.

Another object of the invention is to provide a single and compact semi-closed life-support breathing system to eliminate the need for other ground and aircraft oxygen systems and supplies.

Another object of the invention is to provide a life-support breathing apparatus recycling users' breath, thus greatly reducing the quantity of oxygen required for a mission.

These and other objects of the invention will become more readily apparent from the ensuing specification when taken in conjunction with the appended claims.

DESCRIPTION OF THE PREFERRED EMBODIMENTS

Figure 1:
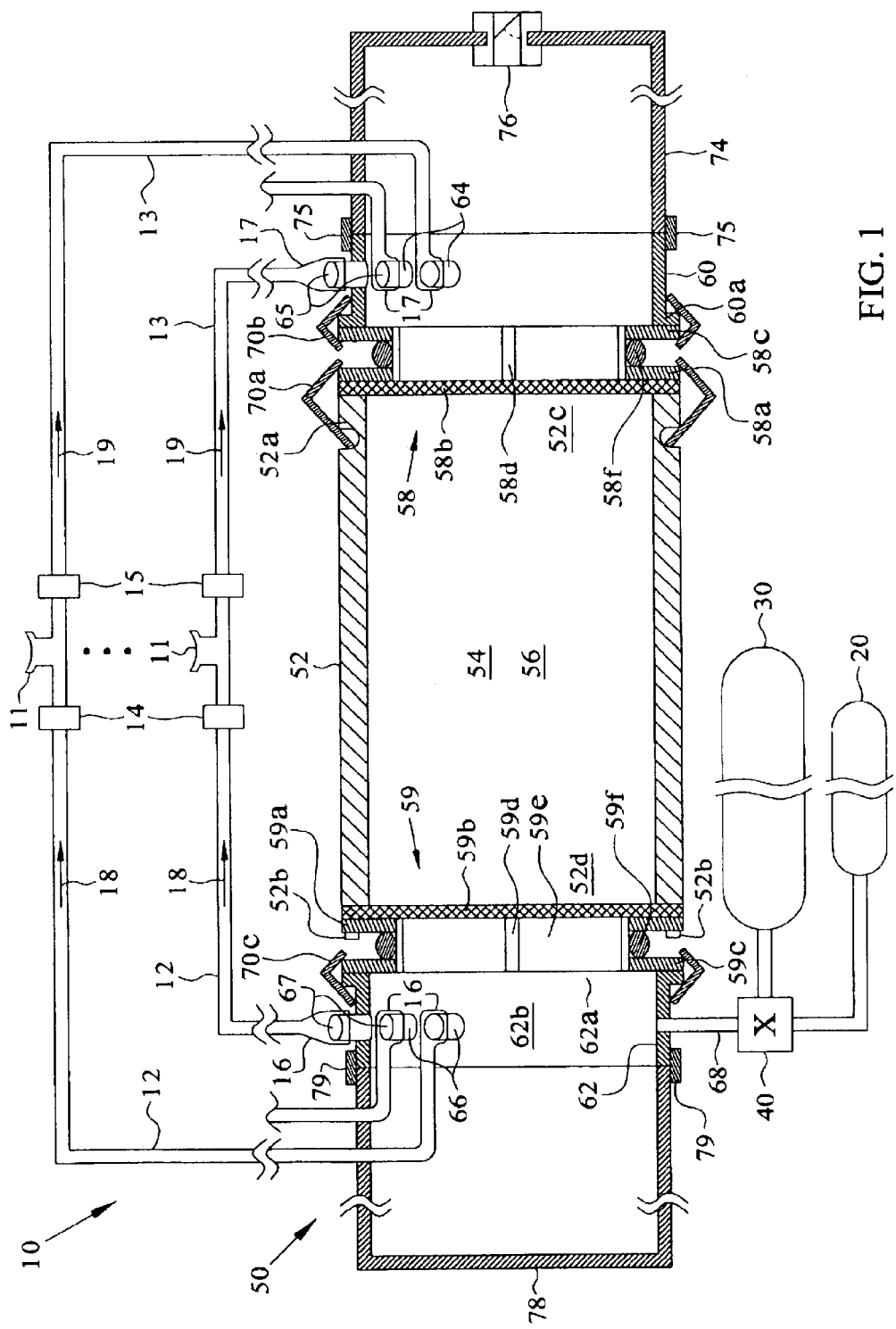
FIG. 1 is a schematic representation of the recycling breathing apparatus of the invention in a life-support system for multiple users at high altitude showing the recycling rebreather in cross section.
Figure 2:
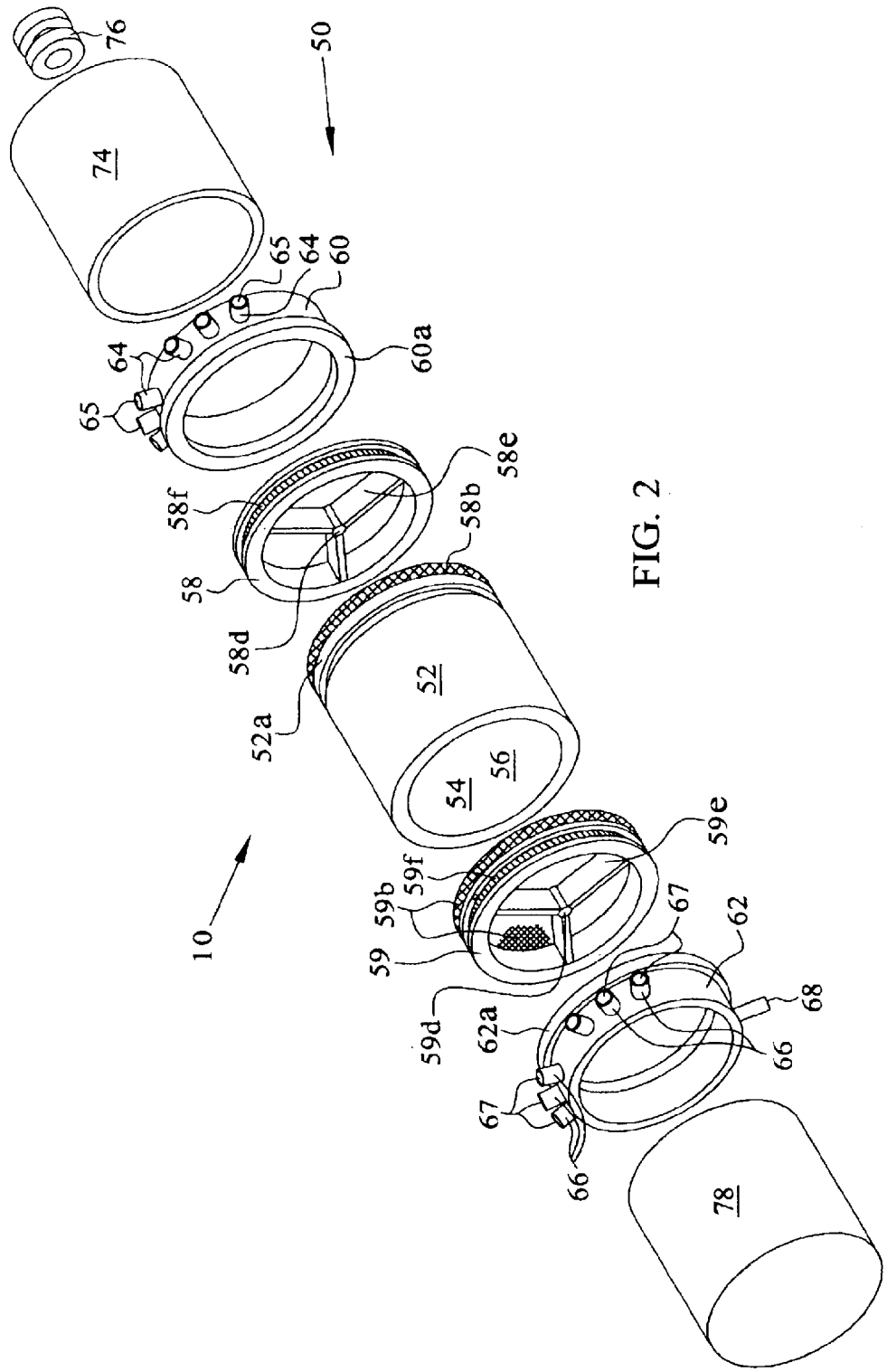
FIG. 2 is an isometric exploded view of the recycling rebreather without the interconnecting flat and V-bands.

Referring to FIGS. 1 and 2, life support system 10 provides life-sustaining oxygen for multiple users via recycling rebreather 50 of this invention. Recycling rebreather 50 is particularly adapted to life support system 10 for one or more users, such as parachutists at high altitude in an aircraft, although it may be used to sustain human life in different situations in other environments as will be readily apparent.

Life support system 10 has a plurality of user interfaces 11 to exchange gas with a like number of users (not shown). Interfaces 11, such as oral-nasal masks, or mouthpieces (as shown) are each shaped to be comfortable when worn or when fitted in a user's mouth and gripped by the teeth. Each mouthpiece 11 is coupled to hoses 12 and 13 via one-way valves 14 and 15, respectively, and hoses 12 and 13, made from lightweight wire-reinforced urethane are connected to recycling rebreather 50 by fittings 16 and 17, respectively. One-way valve 14 on one side of each mouthpiece 11 allows only one-way flow of gas 18 (schematically shown as arrow 18) through hose 12 from recycling rebreather 50 when a user inhales gas 18. One-way valve 15 on the other side of each mouthpiece 11 allows only one-way flow of gas 19 (schematically shown as arrow 19) through hose 13 to recycling breather 50 when a user exhales gas 19.

Life support system 10 has a first tank of oxygen 20 and a second tank of oxygen 30 connected to a selector valve 40. First oxygen tank 20 is smaller than second oxygen tank 30 and is used to help purge other gas from and fill oxygen in recycling rebreather 50 at a relatively high rate at the start of a period of use of system 10. Second oxygen tank 30 has considerably more volume of oxygen than tank 20 to provide life support by multiple users over a sustained, longer period of time. Recycling rebreather 50 has a cylindrical shell-shaped scrubber body 52 around a cylindrical cavity 54 that is virtually filled with a carbon dioxide absorbent 56, such as the $CO_2$ absorbent commercially marketed under the trademark SODASORB by W. R. Grace and Co., 55 Hayden Ave, Lexington, Mass. 02173, or under the trademark SOFNOLIME by Molecular Products LTD., Mill End Thaxed Village, Essex CM62LT, United Kingdom Nk 00000. One hundred grams of this calcium hydroxide based absorbent can absorb, or scrub about fifteen liters of $CO_2$ from gas before the $CO_2$ concentration in the gas exiting the absorbent reaches one percent. The size of scrubber body 52 and cavity 54 and amount of $CO_2$ absorbent, or scrubber 56 can be readily made larger or smaller to scrub the exhaled gas from different numbers of users and can take into consideration the different types of work being done and exertion levels of the users. Another factor to consider regarding the size of these constituents is the duration of usefulness (i.e., how long a mission is expected to take).

Scrubber body 52 has an annular rim 52a at one end and a number of screws 52b securing an annular rim structure 59a of an outlet retainer 59 to it at its opposite end. A V-shaped band 70a is tightened to engage annular rim 52a and an annular rim 58a of an inlet retainer 58 to secure inlet retainer 58 to scrubber body 52.

Inlet retainer 58 and outlet retainer 59 each respectively have a disc-shaped retainer screen 58b and 59b extending across opposite open ends 52c and 52d of scrubber body 52 to define the longitudinal limits of cavity 54 and the volume of $CO_2$ absorbent 56 contained in it. Discshaped retainer screens 58b and 59b are sized to completely cover open ends 52c and 52d. Each screen 58b and 59b has a screen-mesh sized to permit the flow of gas while being small enough to prevent any of $CO_2$ absorbent 56, or scrubbing material from entering inlet hose manifold 60 or outlet hose manifold 62.

Inlet hose manifold 60 has an outwardly extending annular rim 60a adjacent to outwardly extending annular rim 58c of inlet retainer 58, and outlet hose manifold 62 has an outwardly extending annular rim 62a adjacent to outwardly extending annular rim 59c of outlet retainer 59. Annular rims 60a and 58c are compressively engaged by tightened annular V-band clamp 70b to hold inlet hose manifold 60 and inlet retainer 58 securely together. An internal brace structure 58d is provided on the inside of inlet retainer 58. Internal brace structure 58d has essentially "Y"-shaped baffles 58e inside of a ring 58f to hold retainer screen 58b in place. Annular rims 62a and 59c are compressively engaged by annular V-band clamp 70c to hold outlet hose manifold 62 and outlet retainer 59 securely together. An internal brace structure 59d is provided on the inside of inlet outlet retainer 59. Internal brace structure 59d has essentially "Y"-shaped baffles 59e inside of a ring 59f to hold retainer screen 59b in place. Ring-shaped springs 58f and 59f of inlet and outlet retainers 58 and 59 are held slightly compressed, respectively, and the open areas in springs 58f and 59f allow unimpeded flow of gas to and from hoses 12 and 13.

Inlet hose manifold 60 additionally has a plurality of tubular inlet port bosses 64 for inlet ports 65 and outlet hose manifold 62 is provided with a plurality of tubular outlet port bosses 66 for outlet ports 67 and a tubular oxygen inlet fitting 68 coupled to selector valve 40. The pluralities of bosses 64 and 66 with their ports 65 and 67 can be symmetrically arranged on manifolds 60 and 62, or they can have other distributions as desired. Tubular inlet fitting 68 is a standard bulkhead fitting having nozzle-like or other diffuser structure (not shown) for oxygen flowing from oxygen tanks 20 and 30 through selector valve 40 to region 62b inside of outlet hose manifold 62. Each tubular inlet port boss 64 of inlet hose manifold 60 is connected to a separate hose 13 and each tubular outlet port boss 66 of outlet hose manifold 62 is connected to a separate hose 12.

Hoses 12 and 13 can be connected to recycling rebreather 50 by forcing them over bosses 64 and 66, respectively, or optionally threaded hose-clamps (not shown) might be wrapped around the hoses and bosses and tightened to assure their secure interconnection. If only one pair of bosses 64 and 66 is to be used by a single user, or if there are too many pairs of inlet and outlet bosses than needed for a particular operation, then the excessive amount of bosses can be temporarily plugged.

An inlet breathing bag 74 is secured to inlet hose manifold 60 by a tightened flat band clamp 75. Inlet breathing bag 74 is made of a flexible, or compliant, rubber-like material to receive exhaled gas from hoses 13. A one-way fitting 76 located at the apex of inlet breathing bag 74 is activated at a predetermined level of overpressure to vent excess amounts of the exhaled gas to the ambient. An outlet breathing bag 78 is secured to outlet hose manifold 62 by a tightened flat band clamp 79. Outlet breathing bag 78 also is made of a flexible, or compliant material to receive $CO_2$ purged gas from $CO_2$ absorbent 56 in cylindrical cavity 54 and oxygen from oxygen tanks 20 and 30 via selector valve 40 and help in mixing them before they are inhaled through hoses 12.

Selector valve 40 is connected to recycling rebreather 50 through tubular inlet fitting 68 to selectively supply, or add prescribed amounts of oxygen from tanks 20 and 30 to recycling rebreather 50. At initiation, or the beginning of an operational cycle, selector valve 40 is turned to simultaneously vent oxygen from both oxygen tanks 20 and 30 in amounts sufficient to purge other gas through one-way valve 76 from not only recycling rebreather 50 but virtually all the rest of life support system 10 as well. Mouthpieces 11 can be at least partially closed during this initiation to prevent undue purging of oxygen from system 10 through them. When selector valve 40 is in this position, the preset oxygen tank 30 delivers to tubular inlet fitting 68 a constant mass flow rate of approximately 1.06 slpm per person (based on 28 Respiratory Minute Volume, RMV in standard liters per minute, (slpm)). In addition when selector valve 40 is in this position, oxygen also is fed to tubular inlet fitting 68 from oxygen tank 20 at a preset rate of approximately 10 slpm per person. The combined flow of oxygen from tanks 20 and 30 creates an oxygen concentration of at least 95% in system 10 within 5 minutes. After about five minutes, oxygen tank 20 is depleted of oxygen and will no longer add oxygen to system 10, and oxygen tank 30 keeps delivering oxygen via valve 40 to become the main supply of oxygen for system 10.

In other words, the rate of flow of oxygen used to purge system 10 from tanks 20 and 30 is in excess of the rate of gas flow that would be used normally by a number of users all inhaling and exhaling through all of mouthpieces 11. The purged gas is replaced with oxygen from oxygen tanks 20 and 30, and system 10 is ready and safe to deliver enough oxygen from tank 30 at its set rate to sustain life over a prolonged period as users go about their tasks.

The semi-closed breathing circuit of life support system 10 greatly reduces the amount of oxygen required to complete a mission. Life support system 10 reduces the number of oxygen tanks otherwise used to only two, one large tank 30 and one small tank 20, and these tanks can be made from composite materials so that the weight of system 10 can be cut by an order of magnitude. Furthermore, the semi-closed circuit of system 10 is more leak tolerant than a fully closed circuit system and thus reduces the chance of hypoxia and the need to constantly monitor oxygen levels.

Semi-closed system 10 of the invention efficiently utilizes oxygen as a number of users perform their tasks. Each user grips a mouthpiece 11 (or wears an oral-nasal breathing cup, or mask if desired) and one-way valves 14 and 15 on opposite sides of mouthpiece 11 are attached to hoses 12 and 13, respectively. One-way valve 14 allows gas to flow in from hose 12 and one-way valve 15 allows the gases to flow out hose 13. When the user breathes out, the exhaled gas flows out of one-way valve 15 through outlet hose 13 and into compliant breathing bag 74 on the upstream side of scrubber body 52 and $CO_2$ absorbent 56. Excessive volumes of the exhaled gas are vented from system 10 through one-way valve 76 on the upstream side of scrubber body 52 and $CO_2$ absorbent 56. The rest of the exhaled gas flows through scrubber body 52 and $CO_2$ absorbent 56 where $CO_2$ is scrubbed-out, or absorbed and onto downstream breathing bag 78. Oxygen from oxygen tank 30 is added in prescribed amounts through tubular inlet fitting 68 extending through outlet hose manifold 62 into region 62b on the downstream side of scrubber body 52 and $CO_2$ absorbent 56. When each user inhales through mouthpiece or mask 11, gas flows from downstream breathing bag 78 and outlet hose manifold 62 through inlet hose 12 and one-way valve 14 to mouthpiece 11 and user.

Since system 10 is a semi-closed design having the constant addition of prescribed amounts of oxygen from oxygen tank 30, any possible leaks are better tolerated. In this context a leak means contamination of the oxygen percentage of the breathing loop, i.e. air or outside atmospheric gas enters the breathing loop, thus diluting the oxygen content. This leak condition is better tolerated in system 10 since oxygen from oxygen tank 30 is constantly being added at a rate that exceeds the demands of the users. Therefore, as one or more leaks possibly develop with respect to the gas recirculation loop of system 10, oxygen is replaced to dilute, replace, and eventually purge the contaminating gas.

The inherent advantages of system 10 of the invention can be adapted, or tailored to meet the needs of a number of users in a wide variety of different applications. For example, life support system 10 can be made for six parachutists that have the need to remain at a high state of readiness during high-altitude transport to a drop zone. During an anticipated mission of four hours that can include about one hour of light activity, two hours of sitting, and one hour of moderate work, a total of about eight hundred eighty-nine liters of oxygen will be required and about eight hundred liters of $CO_2$ will be produced.

Because the highest rate of oxygen consumption during this mission is 1.064 slpm/person during the period of moderate work, the flow rate at all times is set to equal the greatest amount expected at any time. Consequently, the rate at which oxygen tank 30 delivers oxygen in system 10 will be 1.064 slpm/person for the entire mission or a total of about 1532 liters of oxygen are required. This figure does not include an amount for a safety factor that must be taken into consideration to account for leaks and purges.

Purge tank 20 could be any one of many such fiber wrapped tanks commercially available from a number of manufactures to have a capacity of about three hundred liters of oxygen to provide five minutes of pre-breath oxygen. Typically, this size of purge tank 20 weighs about 5.75 pounds including tank, oxygen, and valve. Main tank 30 can also be a fiber wrapped tank. An exemplary tank that might be used for main tank 30 could be a model 687 fiber wrapped tank marketed by SCI, 325 Enterprise Place, Pamona, Calif. 91768. This 6.62-inch by 20.3 inch tank has a capacity of about 1714 liters of oxygen at three thousand psi and weighs about 14.3 pounds including tank gas and valve. Cylindrical cavity 54 might have a 9.5 inch diameter and 7.75 inch length to contain an 8.88 liter volume containing about 17.6 pounds of $CO_2$ absorbent 56, and both breathing bags 74 and 78 each have an 11 inch diameter and 9.5 inch length. These components with manifolds and their associated clamps are aligned and coaxially extend in a cylindrically-shaped volume measuring about 11 inches in diameter by 38 inches long and with hoses 12, 13, mouthpieces 11, valve 40 and associated mounting frame, panels and hardware (not shown) weigh only about one hundred ten pounds.

The advantage of the semi-closed system 10 of this invention as compared to the currently used open circuit system is that system 10 is lighter weight, uses less gas so that less gas needs to be carried with the users, and is a less logistically intensive system. System 10 operating as a semi-closed circuit may use more oxygen than a closed circuit design. However, semi-closed circuit system 10 has inherent advantages over a closed circuit design, such as being more leak tolerant and not requiring oxygen monitors that would otherwise add weight and might be susceptible to failure and possible severe consequences in the demanding environments where such a system is used.

Components of system 10 are made from lightweight, strong noncorrosive or corrosion resistant composite materials wherever possible to assure structural integrity and long-term reliability. The exact locations and shapes of bosses 64 and 66 as well as the amount of such bosses can be changed to match the demands of different applications.

Having the teachings of this invention in mind, modifications and alternate embodiments of system 10 may be adapted without departing from the scope of the invention. Its uncomplicated, compact design lends itself to numerous modifications to permit its reliable use in hostile environments. For examples, different numbers of users can be provided with life-sustaining oxygen for different periods of time by making the dimensions smaller or larger and including more or less oxygen, absorbent, etc. $CO_2$ absorbent 56 can be selected from a number of commercially available absorbents that have been proven to operate successfully under a variety of different conditions. System 10 can be made larger and of heavier materials if larger size and weight are not as important. In other words, the size and location of the constituents of system 10 can be varied, and can be made larger or smaller in different shapes and fabricated from a wide variety of materials to assure resistance to corrosion, sufficient strength, and long term reliable operation under different operational requirements.

The disclosed components and their arrangements as disclosed herein, all contribute to the novel features of this invention. System 10 is a compact, cost-effective, unattended life support system for use in different environments. Therefore, system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

What is claimed is:

1. A semi-closed rebreather comprising:

a scrubber body;

an inlet hose manifold connected to a first side of said scrubber body, said inlet hose manifold having at least one inlet port boss having an inlet port to receive exhaled gas;

an overpressure valve fitting communicating with said inlet hose manifold to vent overpressure amounts of said exhaled gas;

$CO_2$ absorbent in said scrubber body to receive said exhaled gas, and scrub $CO_2$ from said exhaled gas;

an outlet hose manifold connected to a second side of said scrubber body, said outlet hose manifold having an inlet fitting to supply oxygen to the region inside of said outlet hose manifold and at least one outlet port boss having an outlet port to feed said oxygen and said $CO_2$ scrubbed gas therethrough;

a flexible inlet breathing bag coupled to said inlet hose manifold, said overpressure valve fitting extending through said flexible inlet breathing bag; and a flexible outlet breathing bag connected to said outlet hose manifold.

2. The rebreather of claim 1 further comprising:

a disc-shaped retainer screen covering said first side and said second side of said scrubber body, said retainer screens being sized to completely cover open ends of said scrubber and having a screen-mesh sized to permit the flow of gases while being small enough to prevent any of said $CO_2$ absorbent from entering said inlet hose manifold and said outlet hose manifold.

3. The rebreather of claim 2 further comprising:

a first V-clamp interposed between said scrubber body and said inlet hose manifold to hold them securely together; and a second V-clamp interposed between said scrubber body and said outlet hose manifold to hold them securely together.

4. The rebreather of claim 3 further comprising:

a first band clamp securing said inlet breathing bag to said inlet hose manifold; and a second band clamp securing said outlet breathing bag to said outlet hose manifold.

5. The rebreather of claim 4 wherein said scrubber body is cylindrically shell-shaped, said inlet and outlet hose manifolds first and second V clamps are annular-shaped, and said first and second band clamps are annular-shaped.

6. The rebreather of claim 5 wherein said scrubber body, inlet and outlet hose manifolds, breathing bags and clamps are aligned and coaxially extend in a cylindrically-shape.

7. The rebreather of claim 6 wherein said inlet hose manifold is provided with a plurality of inlet port bosses each having an inlet port and said outlet hose manifold is provided with a plurality of outlet port bosses each having an outlet port.

8. The rebreather of claim 7 further comprising:

a first one-way valve connected between each first hose and said user interface to permit only one-way flow of gas to said inlet hose manifold; and a second one-way valve connected between each second hose and said user interface to permit only one-way flow of gas from said outlet hose manifold.

9. A semi-closed life support system comprising:

at least one user interface to exchange gas with a user;

a separate first and second hose connected to each user interface;

a scrubber body;

an inlet hose manifold connected to a first side of said scrubber body, said inlet hose manifold having at least one inlet port boss connected to a separate first hose to receive exhaled gas;

an overpressure valve fitting communicating with said inlet hose manifold to vent overpressure amounts of said exhaled gas;

$CO_2$ absorbent in said scrubber body to receive said exhaled gas, and scrub $CO_2$ from said exhaled gas;

an outlet hose manifold connected to a second side of said scrubber body, said outlet hose manifold having an inlet fitting to supply oxygen to the region inside of said outlet hose manifold and at least one outlet port boss connected to a separate second hose to feed said oxygen and said $CO_2$ scrubbed gas to said user interface;

a flexible inlet breathing bag coupled to said inlet hose manifold, said overpressure valve fitting extending through said flexible inlet breathing bag; and a flexible outlet breathing bag connected to said outlet hose manifold.

10. The system of claim 9 further comprising:

a disc-shaped retainer screen covering said first side and said second side of said scrubber body, said retainer screens being sized to completely cover open ends of said scrubber and having a screen-mesh sized to permit the flow of gas while being small enough to prevent any of said $CO_2$ absorbent from entering said inlet hose manifold and said outlet hose manifold.

11. The system of claim 10 further comprising:

a first V-clamp interposed between said scrubber body and said inlet hose manifold to hold them securely together; and a second V-clamp interposed between said scrubber body and said outlet hose manifold to hold them securely together.

12. The system of claim 11 further comprising:

a first band clamp securing said inlet breathing bag to said inlet hose manifold; and a second band clamp securing said outlet breathing bag to said outlet hose manifold.

13. The system of claim 12 wherein said scrubber body is cylindrically shell-shaped, said inlet and outlet hose manifolds first and second V clamps are annular-shaped, and said first and second band clamps are annular-shaped.

14. The system of claim 13 wherein said scrubber body, inlet and outlet hose manifolds, breathing bags and clamps are aligned and coaxially extend in a cylindrically-shape.

15. The system of claim 14 wherein a plurality of user interfaces are each connected to a separate first and second hose, said inlet hose manifold is provided with a plurality of inlet port bosses each having an inlet port coupled to a separate first hose, and said outlet hose manifold is provided with a plurality of outlet port bosses each having an outlet port coupled to a separate second hose.

16. The system of claim 15 further comprising:

a first one-way valve connected between each first hose and said user interface to permit only one-way flow of gas to said inlet hose manifold; and a second one-way valve connected between each second hose and said user interface to permit only one-way flow of gas from said outlet hose manifold.

\* \* \* \* \*